(12) United States Patent  
Uchiyama et al.

(10) Patent No.: US 8,111,337 B2  
(45) Date of Patent: Feb. 7, 2012

(54) LIQUID CRYSTAL PROJECTOR

(75) Inventors: Masahiro Uchiyama, Osaka (JP); Yoshihiro Furuta, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 642 days.

(21) Appl. No.: 12/140,382

(22) Filed: Jun. 17, 2008

(65) Prior Publication Data

US 2008/0316376 A1 Dec. 25, 2008

(30) Foreign Application Priority Data

Jun. 22, 2007 (JP) ................................ 2007-164783

(51) Int. Cl.  
*G02F 1/1335* (2006.01)

(52) U.S. Cl. ............................... 349/5; 349/96; 349/158

(58) Field of Classification Search ................ 349/5, 96, 349/158  
See application file for complete search history.

(56) References Cited

U.S. PATENT DOCUMENTS

2005/0237489 A1* 10/2005 Nakashima et al. ............ 353/20

FOREIGN PATENT DOCUMENTS

JP 2001-272671 A 10/2001  
JP 2007147931 * 6/2007

* cited by examiner

*Primary Examiner* — Eric Wong  
(74) *Attorney, Agent, or Firm* — Westerman, Hattori, Daniels & Adrian, LLP

(57) ABSTRACT

An LCD projector has LCD panels, each including polarization plates one on the light incidence side and another on the light emitting side of each LCD panel. The LCD panel is provided with a highly transparent auxiliary polarization plate between the LCD panel and the polarization plate on the light emitting side. The LCD panel is further provided with an optically anisotropic transparent substrate for supporting the highly transparent auxiliary polarization plate. The transparent substrate is arranged such that one of its anisotropic optical axes is inclined at an angle not more than 0.5 degrees with respect to the face of the auxiliary polarization plate when the face is parallel to the direction of light propagation. This arrangement ensures longer lives of the polarization plates on the light emitting sides while suppressing color irregularity on a black screen and degradation of picture contrast of the LCD projector.

3 Claims, 2 Drawing Sheets

LIQUID CRYSTAL PROJECTOR

FIELD OF THE INVENTION

This invention relates to a liquid crystal display (LCD), and more particularly, to an LCD unit.

BACKGROUND OF THE INVENTION

Decrease in life of an optical apparatus such as LCD panels and polarization plates has become increasingly a serious problem in recent years as they are used in LCD projector operated at high brightness and high contrast. To cope with this problem, each of the polarization plates is supported by a transparent substrate having an anisotropic refractive-index, such as a single-crystalline sapphire substrate or quartz substrate that has a good thermal conductivity (heat dissipation property).

Japanese Patent Application Laid Open No. 2001-272671 discloses an LCD projector equipped with an optical system for providing illumination light, an electrooptic apparatus for modulating the light provided by the optical system based on picture information, and a projection system for projecting beams of light modulated by the electrooptic apparatus. The electrooptic apparatus has a substantially rectangular single-crystalline sapphire substrate and a polarization plate mounted on the single-crystalline sapphire substrate on at least the light incidence side or light emitting side of the electrooptic apparatus. The single-crystalline sapphire substrate, substantially rectangular in shape defined by substantially two orthogonal sides, has an optically anisotropic crystalline axis known as C axis that is substantially parallel with a substrate surface and inclined at an angle of about 3 to 7 degrees with respect to one of the two substantially orthogonal sides. Said one side is called a reference side.

In order to extend the life of these polarization panels that constitute the electrooptic apparatus together with the LCD panels, it may be considered useful to provide a highly transparent auxiliary polarization plate between each LCD panel and the polarization plate on the light emitting side of the LCD panel.

Unfortunately, however, inclination of C axis (or Z axis in the case of sapphire single crystal) of a highly transparent auxiliary polarization plate on the light emitting side has more influence on the display performance of the LCD panel than that of the aforementioned ordinary polarization plate. For example, the inclination is often a source of color irregularity on a supposedly black screen and/or a source of contrast loss of a picture.

SUMMARY OF THE INVENTION

In view of the prior art problems as discussed above, it is an object of the invention to provide an LCD projector having LCD panels each equipped with a highly transparent auxiliary polarization plate that ensures a longer life of the associated polarization plate on the light emitting side of the LCD panel while suppressing color irregularity and contrast degradation of the LCD panel.

To this end, there is provided in accordance with one aspect of the invention an LCD projector having: LCD panels each adapted to modulate the light illuminating each LCD panel based on an image signal received; a projection lens for projecting the light thus modulated by the LCD panels; and a source of light for emitting light to illuminate the LCD panels, the LCD projector characterized in that:

each of the LCD panels is provided on the light incidence side and the light emitting side thereof with a first and a second polarization panel, respectively;

a highly transparent auxiliary polarization panel is provided between the LCD panel and the second polarization panel; and the highly transparent auxiliary substrate is supported by a transparent substrate having refractive index anisotropy (such substrate hereinafter referred to as optically anisotropic substrate) such that one of the anisotropic optical axes is inclined at an angle not more than 0.5 degrees with respect to the plane thereof parallel to the direction of light propagation.

In this arrangement, the highly transparent auxiliary polarization plate can not only extend the life of the polarization plate on the light emitting side but also reduce variations in polarization status of light passing through the anisotropic transparent substrate, thereby suppressing color irregularity on a black screen and contrast degradation.

In this case, the optically anisotropic transparent substrate supporting the highly transparent auxiliary polarization plate may be a single-crystalline sapphire substrate.

Cooling of the LCD panel is then enhanced by the single-crystalline sapphire substrate, since it has a high thermal conductivity (or good heat dissipation property).

The optically anisotropic transparent substrate supporting the highly transparent auxiliary polarization plate may be a quartz substrate.

A quartz substrate can reduce the cost of the LCD projector, since it is cheaper than a single-crystalline sapphire substrate.

DETAILED DESCRIPTION OF THE PREFERRED EMBODIMENT

Figure 1:
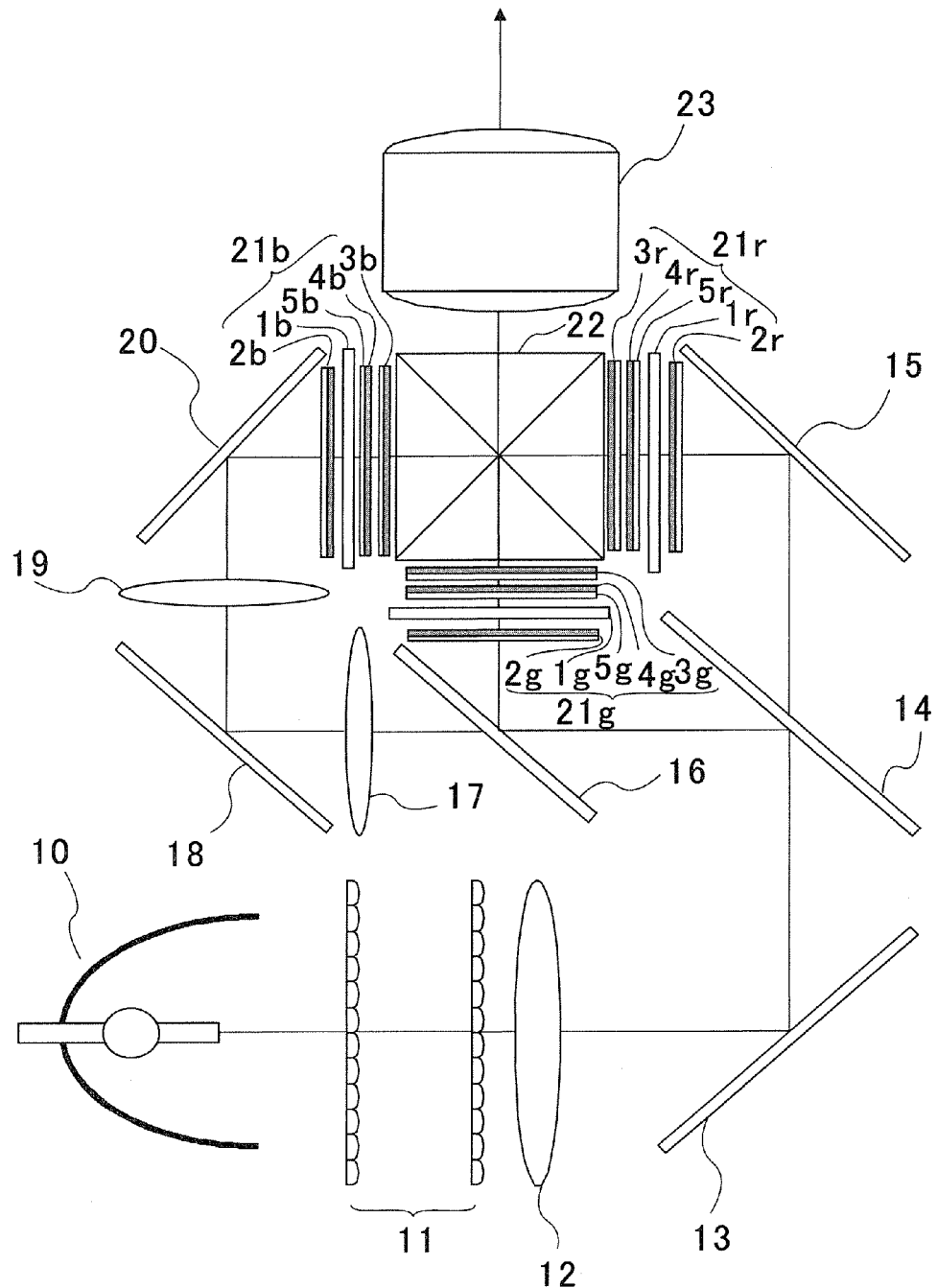
FIG. 1 is a plan view of an optical system for use with a three-LCD panel projector in accordance with one embodiment of the invention.

The invention will now be described in detail by way of example with referenced to the accompanying drawings. FIG. 1 is a plan view of an optical system for use with a three-plate type LCD projector in accordance with a first embodiment of the invention.

A beam of white light emitted from a light source 10 such as a metal halide lamp or an extra-high pressure mercury lamp passes through a pair of integrator lenses 11 and a condenser 12. The beam is then reflected by a total reflection mirror 13 through an angle of 90 degrees and led to the first dichroic mirror 14. Each of the integrator lenses 11 is designed to uniformize non-uniform luminous light emitted from the light source 10 to uniformly illuminate the entire surface of the LCD panel with light, thereby reducing the variations in the luminosity over the central and peripheral regions of the LCD panel.

The first dichroic mirror 14 transmits light in the red wavelength region, and reflects light in the cyanogen (green+blue) wavelength region. The light in the red wavelength region that has passed through the first dichroic mirror 14 is reflected by a total reflection mirror 15 to an LCD unit 21r comprising a transmission type LCD panel for red light and polarization plates. The light is modulated in the LCD unit 21r by a first picture signal.

On the other hand, the light in the cyanogens wavelength region, reflected by the first dichroic mirror 14, is led to a second dichroic mirror 16. The second dichroic mirror 16 transmits light in the blue wavelength region, and reflects light in the green wavelength region. The light in the green wavelength region, reflected by the second dichroic mirror 16, is led to an LCD unit 21g comprising a transmission type liquid crystal panel for green light and polarization plates. The light is modulated in the LCD unit 21g by a second picture signal.

Via relay lenses 17 and 19 and total reflection mirrors 18 and 20, the light in the blue wavelength region that has passes through the second dichroic mirror 16 is led to an LCD unit 21b comprising a transmission type LCD panel for blue light and polarization plates. The light is modulated in the LCD unit 21b by a third picture signal.

The colored beams of modulated light from the respective LCD units 21r, 21g, and 21b are compounded by a dichroic prism 22 into a beam of colored image light. The resultant image light is projected by a projection lens 23 onto a screen (not shown).

The LCD units 21r for red light includes: a transmission type LCD panel 1r for red light; polarization plates 2r and 3r respectively arranged on the light incidence side and emitting side of the LCD panel 1r in a conventional manner; and a highly transparent auxiliary polarization plate 4r arranged between the LCD panel 1r and the polarization plate 3r on the light emitting side. The highly transparent polarization plate 4r is provided to extend the life of the polarization plate 3r on the light emitting side of the LCD panel 1r, and mounted on a transparent single-crystalline sapphire substrate 5r having refractive index anisotropy.

Similarly, the LCD units 21g for green light includes: a transmission type LCD panel 1g for green light; polarization plates 2g and 3g respectively arranged on the light incidence side and emitting side of the LCD panel 1g in a conventional manner; and a highly transparent auxiliary polarization plate 4g arranged between the LCD panel 1g and the polarization plate 3g on the light emitting side of the LCD panel 1g. The highly transparent polarization plate 4g is provided to extend the life of the polarization plate 3g on the light emitting side of the LCD panel 1g, and mounted on a transparent single-crystalline sapphire substrate 5g having refractive index anisotropy.

Similarly, the LCD units 21b for green light includes: a transmission type LCD panel 1b for blue light; polarization plates 2b and 3b, respectively arranged on the light incidence side and emitting side of the LCD panel 1b in a conventional manner; and a highly transparent auxiliary polarization plate 4b arranged between the LCD panel 1b and the polarization plate 3b on the light emitting side of the LCD panel 1b. The highly transparent polarization plate 4b is provided to extend the life of the polarization plate 3b on the light emitting side of the LCD panel 1b, and mounted on a transparent single-crystalline sapphire substrate 5b having refractive index anisotropy.

The single-crystalline sapphire substrates 5r, 5g, and 5b used as supportive substrates for the highly transparent auxiliary polarization plates 4r, 4g, and 4b are oriented so that their C axes are substantially parallel to the surfaces of the respective substrates. The C axes of the single-crystalline sapphire substrates 5r, 5g, and 5b are oriented in this way for the reason that then the temperature distributions in the auxiliary polarization plates 4r, 4g, and 4b stuck on the respective substrates become more uniform as compared with the case where the C axes are oriented perpendicular to the substrate surfaces.

The C axes of the single-crystalline sapphire substrates 5r, 5g, and 5b are ideally parallel to the reference sides of the respective substantially rectangular substrates 5r, 5g, and 5b. However, due to manufacturing variations, each of the C axes can be inclined to the reference side at an angle of q say (the angle hereinafter referred to as inclination angle). In the embodiment shown herein, the inclination angle q is controlled to be less than 0.5 degrees with respect to the reference side.

Figure 2:
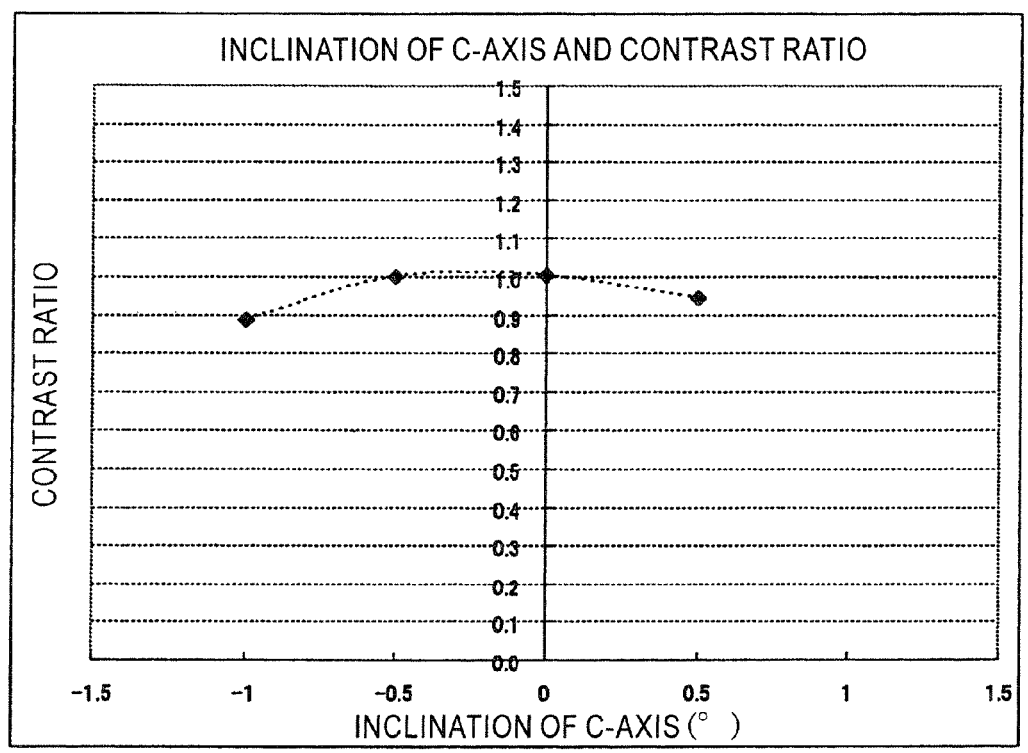
FIG. 2 is a graph showing the contrast ratio of an LCD panel as a function of the inclination of C-axis of a single-crystalline sapphire substrate supporting a highly transparent auxiliary polarization plate.

FIG. 2 is a graphical representation of the contrast ratio of an LCD panel as a function of the inclination angle of C axis of a single-crystalline sapphire substrate (5r, 5g, or 5b) supporting the highly transparent auxiliary polarization plate (4r, 4g, or 4b). The abscissa represents the inclination angle of C axis, while the ordinate represents the relative contrast ratio normalized to the maximum contrast ratio. Although the relationship between the contrast ratio and the inclination angle is supposedly symmetrical about 0-degree inclination of C axis, the maximum contrast ratio is shifted to the left (negative side) in FIG. 2 by about 0.25 degrees. This is probably due to variations of parts of the measuring apparatuses used, which will be taken into consideration in the following discussion.

It will be understood from FIG. 2 that the contrast ratio can be controlled by controlling the range of the inclination angle of C axis. Decrease in the contrast ratio due to the inclination of C axis can be suppressed to less than 10% by limiting the inclination angle within the range of ±0.5 degrees, in view of the fact that the contrast ratio becomes large only when the inclination angle exceeds this range. Accordingly, the overall contrast variations of the optical system including other optical components can be suppressed to less than 15%. Moreover, color irregularity on a black screen is simultaneously improved.

Thus, in accordance with this embodiment, the highly transparent auxiliary polarization plates 4r, 4g, and 4b facilitate not only extension of the lives of the polarization plates 3r, 3g, and 3b on the light emitting sides, but also suppression of the change in polarization status of light that passes through the single-crystalline sapphire substrates 5r, 5g, and 5b serving as transparent anisotropic substrates, thereby enabling suppression of color irregularity on a black screen and decrease in contrast.

Since the transparent anisotropic substrates supporting the respective highly transparent auxiliary polarization plates 4r, 4g, and 4b are single-crystalline sapphire substrates 5r, 5g, and 5b having a high thermal conductivity (or good heat dissipative property), cooling of the polarization plates 4r, 4g, and 4b is improved.

Although the invention has been described above for the case where single-crystalline sapphire substrates are used as the supportive transparent substrates for the highly transparent auxiliary polarization plates, substantially the same results can be obtained if quartz substrates are used as the transparent supportive substrates. In this case, optical axes of interest to be controlled are Z axes. Since quartz substrates are cheaper than single-crystalline sapphire substrates, costs of the LCD panels can be reduced accordingly.

It should be understood that although the invention has been described regarding C axes of single-crystalline sapphire substrates or Z axes of quartz substrates, the same merits can be obtained by controlling the inclinations of A axes of single-crystalline sapphire substrates which are perpendicular to C axes or by controlling X axes of quartz substrates which are perpendicular to Z axes. What is essential to the invention is that one of the optical axes of the respective crystalline substrate exhibiting refractive index anisotropy is inclined not more than 0.5 degrees with respective to the plane of the substrate parallel to the beam of light.

It should be also understood that the optical system is not limited to the one described above and shown in FIG. 1. The invention can be applied equally well to LCD projectors equipped with different types of optical systems.

For example, LCD panels of the invention can be of any type, system, or mode. For example, they can be of TN (twisted nematic) type, VA (vertically aligned) type, IPS (in-plane-switching) system, NW (normally white) mode, or NB (normally black) mode.

The invention claimed is:

1. An LCD projector having: LCD panels adapted to modulate the light that illuminates the panels in accordance with an image signal received; a projection lens for projecting the light thus modulated by the LCD panels; and a source of light for emitting the light for illuminating the LCD panels, characterized in that:

each of the LCD panels is provided on the light incidence side and the light emitting side thereof with a first and a second polarization plate, respectively;

a highly transparent auxiliary polarization plate is provided between the LCD panel and the second polarization plate; and the highly transparent auxiliary polarization plate is supported by an optically anisotropic transparent substrate having one anisotropic optical axis inclined at an angle not more than 0.5 degrees with respect to the plane thereof parallel to the direction of light propagation.

2. The LCD projector according to claim 1, wherein the optically anisotropic transparent substrate is a single-crystalline sapphire substrate.

3. The LCD projector according to claim 1, wherein the optically anisotropic transparent substrate is a quartz substrate.

* * * * *